United States Patent
Fukaya et al.

[11] Patent Number: 6,156,405
[45] Date of Patent: *Dec. 5, 2000

[54] MAGNETIC RECORDING MEDIUM AND METHOD OF FABRICATING THE SAME

[75] Inventors: Shinji Fukaya, Odawara; Yoshinori Honda, Hiratsuka; Akira Kato; Shuichi Kojima, both of Odawara, all of Japan

[73] Assignee: Hitachi, Ltd., Tokyo, Japan

[*] Notice: This patent is subject to a terminal disclaimer.

[21] Appl. No.: 09/316,146

[22] Filed: May 21, 1999

Related U.S. Application Data

[63] Continuation of application No. 08/935,731, Sep. 23, 1997, Pat. No. 5,976,661, which is a continuation of application No. 08/483,981, Jun. 7, 1995, Pat. No. 5,707,706.

[30] Foreign Application Priority Data

Jul. 20, 1994 [JP] Japan ................................ 6-167678
Mar. 22, 1995 [JP] Japan ................................ 7-62315

[51] Int. Cl.[7] ........................................................ G11B 5/66
[52] U.S. Cl. .................... 428/65.3; 428/65.4; 428/65.6; 428/64.2; 428/64.4; 428/337; 428/433; 428/694 ST; 428/694 R; 428/694 TR; 428/694 SG; 428/900; 428/694 T
[58] Field of Search .................... 428/65.3, 65.4, 428/65.6, 64.2, 64.4, 337, 433, 694 ST, 694 R, 694 TR, 694 T, 694 SG, 900

[56] References Cited

U.S. PATENT DOCUMENTS

| | | | |
|---|---|---|---|
| 4,859,636 | 8/1989 | Arataui et al. | 501/72 |
| 4,987,020 | 1/1991 | Bennebat et al. | 428/65.3 |
| 5,094,896 | 3/1992 | Morita et al. | 428/65.4 |
| 5,133,286 | 7/1992 | Choo et al. | 118/725 |
| 5,277,960 | 1/1994 | Tsuya et al. | 428/119 |
| 5,480,695 | 1/1996 | Tenhover et al. | 428/65.5 |
| 5,496,653 | 3/1996 | Saito et al. | 428/694 B |
| 5,707,706 | 1/1998 | Fukoya | 428/65.3 |

FOREIGN PATENT DOCUMENTS

| | | |
|---|---|---|
| 2-43360 | 2/1990 | Japan . |
| 2-179879 | 7/1990 | Japan . |
| 5-33128 | 2/1993 | Japan . |
| 5-144557 | 6/1993 | Japan . |

*Primary Examiner*—Leszek Kiliman
*Attorney, Agent, or Firm*—Mattingly, Stanger & Malur, P.C.

[57] ABSTRACT

A magnetic recording has very low warp characteristics but excellent film characteristics. Particularly, the recording medium has a high coercivity with a small range of coercivity distribution, with a warp characteristic below 3 μm per radial inch. The medium is formed by heating a substrate at a high temperature with a temperature distribution on the substrate that is improved by the use of a heat distribution mask, which reduces the temperature distribution of the substrate to below ±3%.

44 Claims, 7 Drawing Sheets

MAGNETIC RECORDING MEDIUM AND METHOD OF FABRICATING THE SAME

This is a continuation application of U.S. Ser. No. 08/935,731, filed Sep. 23, 1997 now U.S. Pat. No. 5,976,661; which is a continuation application of U.S. Ser. No. 08/483,981, filed Jun. 7, 1995 now U.S. Pat. No. 5,707,706.

BACKGROUND OF THE INVENTION

1. Field of the Invention

The present invention relates to a magnetic recording medium and a method of fabricating the same and, more particularly, to a magnetic recording medium formed by a method of heating a substrate when forming a magnetic film thereon. The present invention also relates to a high-quality magnetic disk capable of high-density recording, and a magnetic disk unit for using the magnetic disk.

2. Description of the Related Art

Intensive efforts have advanced in recent years in the field of magnetic disk units to increase recording density for disks of various diameters. Important factors in the increase of recording density are the improvement of coercive force, reduction of noise attributable to the recording medium, and reduction of flying height of the magnetic head relative to the medium. There is a correlation between coercive force and the temperature at which the substrate is heated during the formation of the magnetic recording medium. Particularly, when the substrate is heated at a high temperature, the coercive force is high.

However, when the substrate is heated at a high temperature, it is subject to warping, which makes it difficult to achieve a high coercive force for the resulting recording medium. In fact, if the substrate warps greatly, undulations are superposed on the output waveform during playback, or, in extreme circumstances, the head may crash against the substrate as a result of the warp. Consequently, it is difficult to reduce the flying height.

Additionally, it is important that the magnetic disk have a uniform in-plane characteristic for high-density magnetic recording.

When fabricating a magnetic disk, a substrate is heated in a vacuum and thin films, including a magnetic film and a protective film, are formed on the substrate by a sputtering process (most often used to produce a rigid, or hard disk) or an evaporation process (most often used for creating a floppy disk). The properties of the magnetic thin film are greatly dependent on the temperature of the substrate during the film forming process. Thus, to form a thin film having a uniform quality, it is desirable to heat the substrate so that the distribution of temperature on the substrate surface is uniform. If the substrate is heated irregularly at a high rate, the substrate may warp or crack, potentially causing the substrate to fall off its support in the vacuum vessel; at least, the substrate will be defective.

Japanese Patent Laid-Open Nos. 2-43360; 2-179879; 3-6367; and 5-144557 disclose methods of regulating substrate temperature distribution. Laid-Open Nos. '360 and '367 use a sectional heater, while Laid-Open Nos. '879 and '557 disclose a heating plate between a heater and the substrate to heat the substrate uniformly. Japanese Patent Laid-Open No. 5-33128 discloses a moving heater for heating a glass substrate uniformly.

Methods using a fixed heater have suffered from ineffective heat distribution, which worsens as the interval between the substrate and the heater increases. Consequently, film properties, such as coercivity, vary over the surface of the substrate. Moreover, if the heat distribution on the substrate varies greatly, which is more likely if a high rate of heating is employed, the substrate warps. Further, if the substrate is composed of a material having a low heat conductivity, such as glass, the substrate may crack if the range of heat distribution is large.

Another disadvantage of the method disclosed in JP '360 is that a sectional heater requires a plurality of external controllers and a complicated heating process. JP '128 suffers from the further disadvantage that a heater-moving mechanism is required which has a large heating chamber and a complicated construction.

Currently, substrates heated by conventional methods during the formation of magnetic disks result in magnetic disks having a coercive force in the range of about 1500 to about 1600 Oe. Such magnetic disks are unsuitable for the high-density recording to be achieved with future technology.

SUMMARY OF THE INVENTION

According to the teachings of the present invention, a magnetic recording medium is produced which has low warp characteristics, but excellent film characteristics. Particularly, the recording medium of the present invention has a high coercivity with a small range of coercivity distribution. The improved magnetic recording medium can be produced by heating the substrate at a high temperature with an improved temperature distribution, so that the tendency of the substrate to warp or crack is greatly reduced.

A uniform magnetic film and a uniform protective film can be formed on the substrate while the substrate is being heated. Consequently, a high coercive force of 2000 Oe (i.e., a magnetic recording medium capable of recording data with a density of 600 Mb/in ) or above can be achieved, and the magnetic disk has excellent in-plane film characteristics (in-plane coercive force distribution of ±5% or below).

Furthermore, the magnetic disk is warped relative to its center by no more than 3 $\mu$m per inch, measured radially. For example, for a 3.5 inch magnetic disk, the peripheral part of the disk is warped no more than 10 $\mu$m with respect to the center.

DETAILED DESCRIPTION OF THE PREFERRED EMBODIMENTS

During a process for fabricating a magnetic recording medium, a substrate, on which a magnetic film is formed, is heated to raise the temperature of the substrate prior to forming the magnetic film. To solve a problem of temperature distribution, a mask is preferably disposed between the heater and the substrate to control the distribution of the heat that reaches the substrate. In particular, because the central part of the substrate is likely to be heated to a temperature that is higher than that of the peripheral part of the substrate, the mask preferably has a central portion corresponding to the central portion of the substrate that absorbs or reflects part of the heat radiated to that portion by the heater, and a heat-transmissive part around the central absorbing or reflecting part. Thus, the quantity of heat radiated by the heater reaches the substrate in a controlled fashion so that the temperature distribution on the substrate is uniform. This prevents the warping and cracking of the substrate that has been a problem prior to this invention.

Preferably, the substrate is heated so that the range of in-plane temperature distribution on the substrate is ±3% or below. When the substrate is a 3.5 inch-diameter disk, it is preferred that the warp of a peripheral part of the disk relative to its center be 10 μm or below. In general, however, it is preferred that the substrate have a warp characteristic that is no greater than 3 μm/inch, measured radially.

Since the substrate is heated to a high temperature, the mask is also heated to a high temperature. To prevent the mask from becoming too hot, it is preferably cooled during the heating process. For example, a cooling medium may be circulated through a cooling device arranged to cool the mask. Further, the side of the mask that faces the heater may be mirror-finished so that the surface reflects a substantial portion of the heat, to maintain a relatively cool temperature for the mask.

A magnetic disk unit suitable for driving a magnetic disk produced according to the teachings of the present invention rotatably supports the disk, and records or reproduces data on or from the disk by moving a magnetic head, which is preferably disposed with a flying height of 40 nm or less between the head and the magnetic disk.

Figure 1:
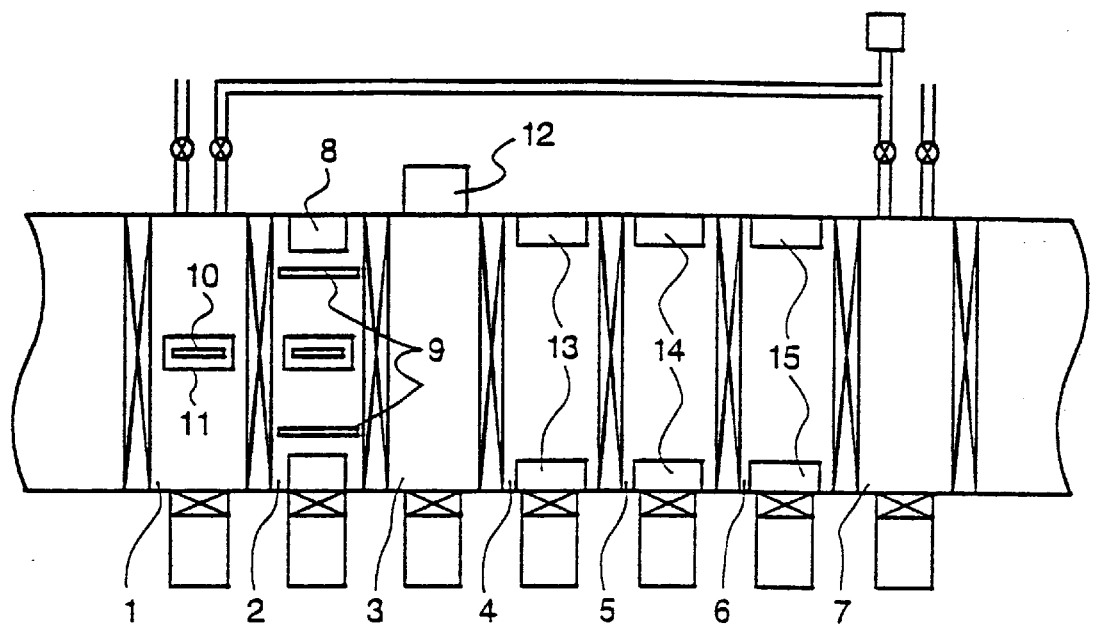
FIG. 1 is a schematic view of a sputtering-type film-forming apparatus constructed and operating according to the teachings of the present invention.

FIG. 1 schematically shows a single-wafer sputtering-type film-forming apparatus constructed and operating according to the teachings of the present invention. The film-forming apparatus has a load-lock chamber 1, a heating chamber 2, a substrate temperature monitoring chamber 3, a base film-forming chamber 4, a magnetic film-forming chamber 5, a protective film-forming chamber 6, and an unload-lock chamber 7. A substrate 10, which is preferably a disk-shaped substrate to be fabricated into a magnetic disk for a hard disk drive, is transferred sequentially through these processing chambers from left to right in the figure, to form laminated layers of different thin films on the substrate, to complete the magnetic disk.

A substrate holder 11 supports the substrate 10 in the load-lock chamber 1, and is transferred from the load-lock chamber 1 to the heating chamber 2 after evacuating the load-lock chamber 1. The heating chamber 2 preferably has a pair of heaters 8 to heat the substrate 10 on both sides, although other arrangements for the heaters themselves may be employed. Masks 9 are disposed between the heaters 8 and the substrate 10. The masks have a special structure which will be described later.

Then, the substrate 10 is transferred to the substrate temperature monitoring chamber 3 and the temperature of the substrate 10 is measured with an infrared radiation pyrometer 12. Then, the substrate 10 is transferred to the base film forming chamber 4, where a base film 18 (FIG. 18) is formed on the substrate 10 by using Cr targets 13 of purity 3N. Then, the substrate 10 is transferred to the magnetic film forming chamber 5, where a magnetic film 19 is formed by using alloy targets 14 of Co—Cr—Pt (18 at% Cr, 10 at% Pt). Then, the substrate 10 is transferred to the protective film forming chamber 6, where a protective film 20 is formed by using C targets 15 of purity 5N. Then, the substrate 10 is transferred to the unload-lock chamber 7, the unload-lock chamber 7 is opened into the atmosphere, and then a lubricating film 21 is formed over the protective film 20 to complete a magnetic disk as shown in FIG. 8.

Figure 8:
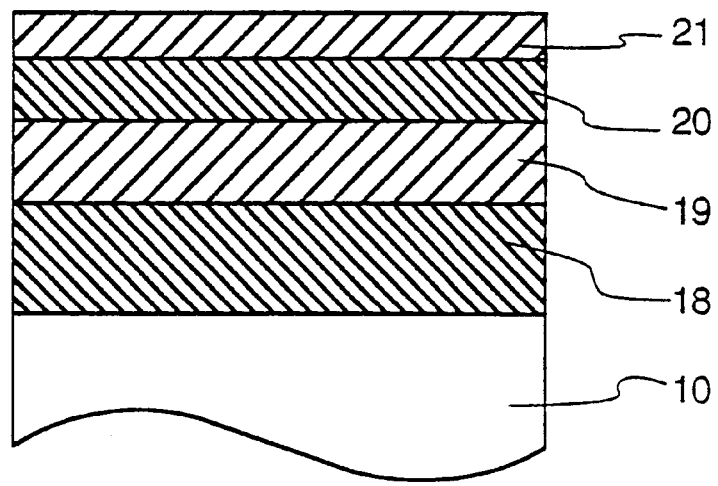
FIG. 8 is a fragmentary schematic sectional view of a magnetic disk.

As shown I FIG. 8, the disk-shaped substrate 10 is, for example, a Ni—P/Al/Mg substrate, and the base film 18 of 750 Å in thickness, the Co—Cr—Ta magnetic film 19 of 350 Å in thickness, the protective film 20 of 200 Å in thickness and the lubricating film of a fluorolubricant of 50 Å in thickness are formed on the substrate 10. The disk-shaped substrate 10 may be a glass substrate and the respective thicknesses and the materials of the thin films formed on the disk-shaped substrate 10 need not be limited to those mentioned above.

The structure of the masks 9 will be described hereinafter with reference to FIGS. 2(a) and 2(b). It was found through examination that a principal cause of cracking and warping of the substrates of magnetic disks is the abnormal heating of the central part of the substrate 10 relative to the heating of the peripheral part of the same.

In general, a mask employed in the present invention is interposed between the heater and the substrate at a given distance from the heater. As a result, heat is distributed on the substrate in a desired, preferably fixed, distribution. Therefore, the objective uniform temperature distribution can be achieved, reducing if not preventing the cracking of the substrate and limiting the warp to an acceptable range. These characteristics further contribute to the superior magnetic characteristics enjoyed by the inventive recording medium.

Figures 2A, 2B:
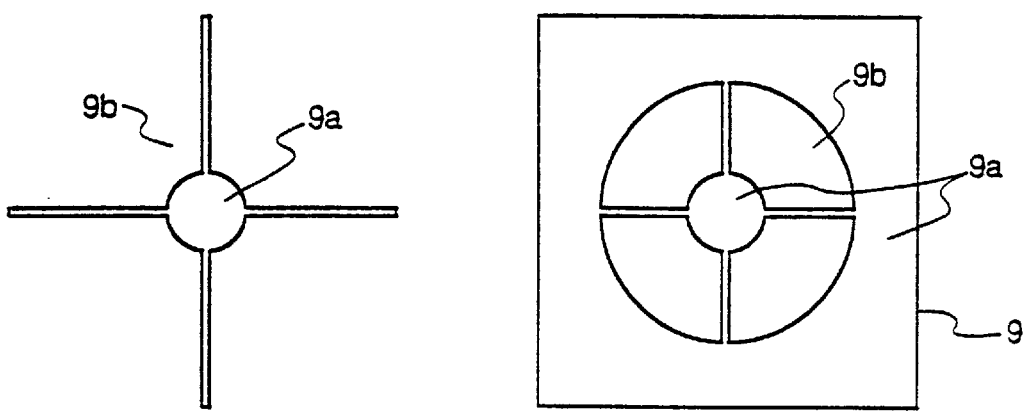
FIGS. 2(a) and 2(b) are plan views of two masks employed according to preferred embodiments of the invention.

A first embodiment employs a mask 9 of a structure as shown in FIG. 2(a), which will be called a type A mask. This mask 9 has a central heat radiation screening part 9a and a heat radiation transmissive part 9b around the heat radiation screening part 91, and is formed of copper.

A second embodiment employs a mask 9 as shown in FIG. 2(b), which will be called a type B mask. This mask 9 has a central heat radiation screening part 9a and four heat radiation transmissive parts 9b, and is formed of copper.

Figure 12:
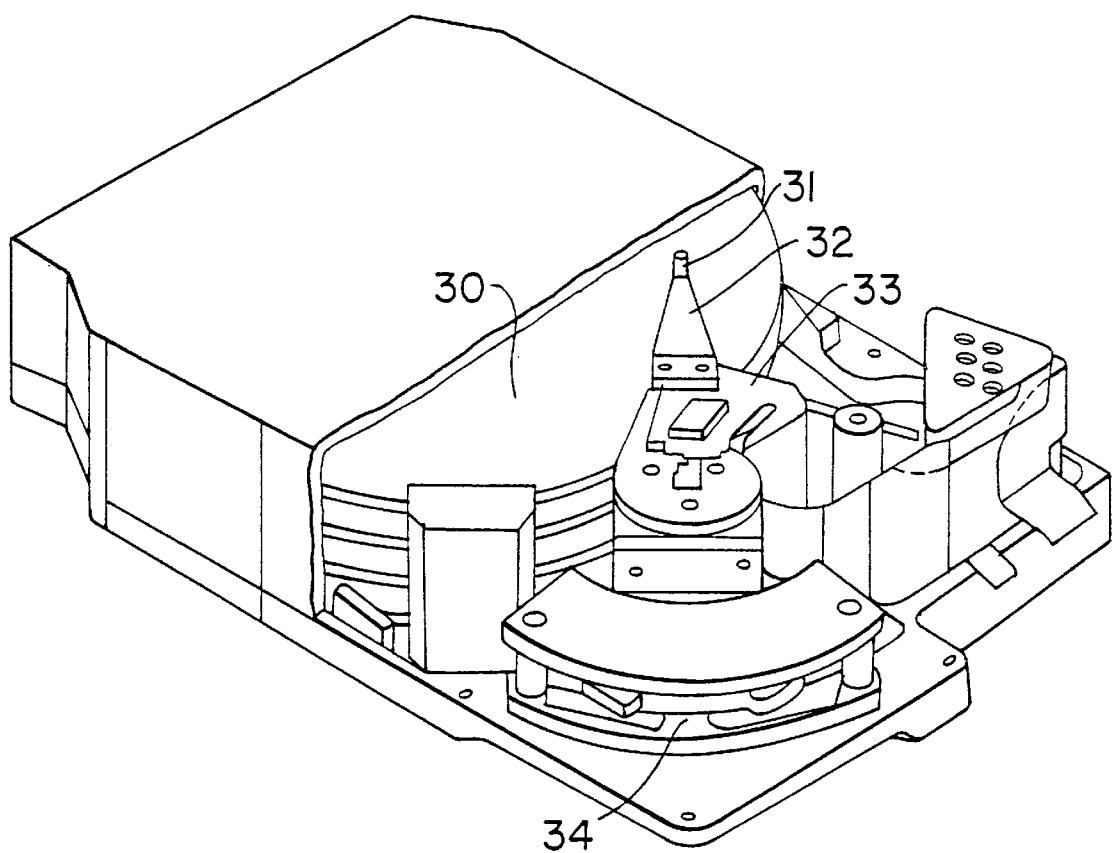
FIG. 12 is a partially cut-away schematic perspective view of a magnetic disk unit.

FIG. 12 shows the configuration of a magnetic disk unit. A plurality of magnetic disks fabricated by the present invention is loaded into the magnetic disk unit to achieve high-density recording. The plurality of magnetic disks 30 are fixed to a spindle which is driven for spinning by a motor, not shown. A magnetic head 31 is disposed opposite to the surface of each magnetic disk 30. The magnetic head 31 is fixed to one end of an arm 32 and the other end of the arm 32 is attached to an actuator 33 so that the arm 32 is turned about an axis. A voice coil motor 34 is attached to the rear end. When a current is supplied to the voice coil motor 34, the actuator 33 is driven for turning about the axis to position the magnetic head at a position corresponding to a desired track for recording/reproducing.

The present invention has been made on the basis of interests in the coercive force and the characteristics of the films of a magnetic disk, and the space between the magnetic disk and the magnetic head. Characteristically, a magnetic disk provided with a magnetic film having a coercive force of 2000 Oe or above and a range of in-plane coercive distribution of ±5% or below is used. The magnetic head is supported for recording/reproducing so that the space between the magnetic head and the magnetic disk is 40 nm or below to achieve high-density recording. If the warp of the magnetic disk is 3 μm/inch along the radial direction or below relative to the central part, for example, if the warp of a 3.5 inch magnetic disk is 10 μm or below, the magnetic disk is loaded into the magnetic disk unit.

Results of experimental fabrication of magnetic disks in which disk-shaped substrates 10 were heated under different conditions will be described hereinafter.

EXAMPLE 1

A disk-shaped substrate 10 was placed in the load-lock chamber 1 of the sputtering type film forming apparatus shown in FIG. 1, the load-lock chamber was evacuated, the disk-shaped substrate 10 was transferred to the heating chamber 2, and then the disk-shaped substrate 10 was heated on its both sides through the masks 9 by the heaters 8. The disk-shaped substrate 10 was an Al—Mg substrate of 3.5 inches in diameter and 0.8 mm in thickness, provided with a plated Ni—P layer (hereinafter referred to as "Ni—P/Al/Mg substrate") produced by Nippon Light Metal Co., Ltd. The masks 9 were the type A masks shown in FIG. 2(a).

Figure 3A:
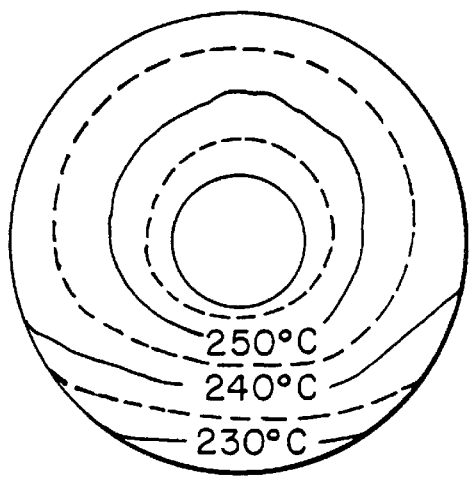
FIGS. 3(a) and 3(b) show the in-plane temperature distributions on disk-shaped substrates according to the present invention when no mask is used and when the mask of FIG. 2(a) is used, respectively.
Figure 3B:
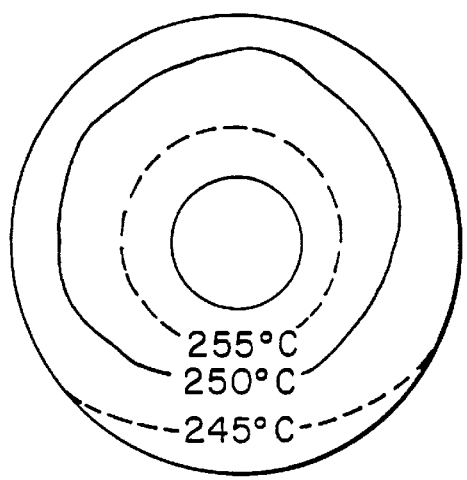

The disk-shaped substrate 10 was heated at a heating rate of 60° C./sec to 250° C. Three seconds after heating, the surface temperature of the substrate 10 was measured in the substrate temperature monitoring chamber 3. The temperature of the substrate 10 during heating was measured with a thermocouple and temperature calibration was performed. The temperature of the substrate was measured with the infrared radiation pyrometer after determining the emissivity of the substrate. FIG. 3(b) shows the in-plane distribution of temperature thus measured on the disk-shaped substrate 10. FIG. 3(a) shows, for comparison, the in-plane distribution of temperature on the disk-shaped substrate heated without using the masks. As is obvious from the comparative observation of FIGS. 3(a) and 3(b), the uniformity of temperature gradients in the vertical direction, the horizontal direction and the radial direction is improved when the masks 9 are disposed in front of the heaters 8.

EXAMPLE 2

Sample disk-shaped substrates 10 were a Ni—P/Al/Mg substrate and a glass substrate produced by Corning Inc. The sample disks 10 were heated through the type B masks shown in FIG. 2(b) in the same manner as that in which the sample disk 10 in the Example 1 was heated.

Figure 4A:
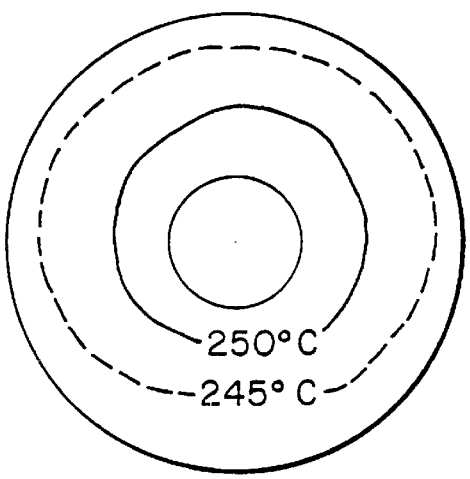
FIGS. 4(a) and 4(b) show in-plane temperature distributions on a Ni—P/Al/Mg substrate and a glass substrate, respectively, when the mask of FIG. 2(b) is used.
Figure 4B:
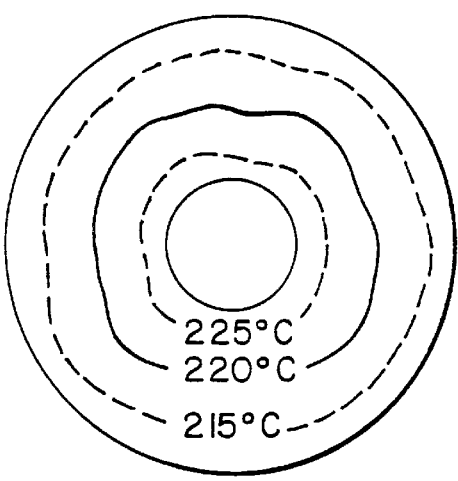

The Ni—P/Al/Mg substrate was heated at a heating rate of 60° C./sec to 250° C. The glass substrate was heated at a heating rate of 40° C./sec to 225° C. Three seconds after heating the substrates, the surface temperature of the substrates were measured. FIGS. 4(a) and 4(b) show temperature distributions respectively on the Ni—P/Al/Mg substrate and the glass substrate. The in-plane temperature differences of the disk-shaped substrates were as small as ±3% or below.

The Ni—P/Al/Mg substrates and the glass substrates were heated at the aforesaid heating rates, respectively, to temperatures in the range of 150 to 280° C. in a heating mode using the masks and in a heating mode not using any masks, and then the warps of the substrates 10 were measured by a substrate flatness tester of an interference system (Fuji Photo Optical Co., Ltd.). The warp of each substrate was represented by the maximum difference between the inner circumference and the outer circumference with respect to a radial direction relative to a flat plane.

Figure 5:
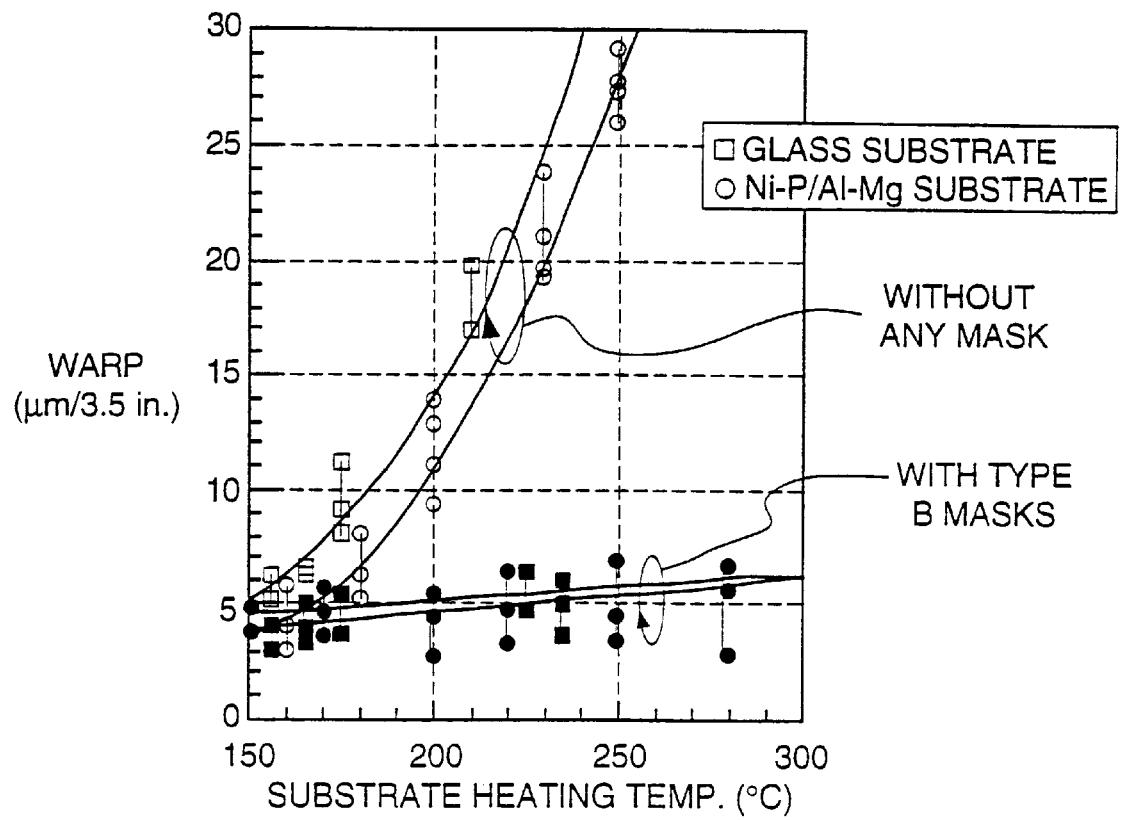
FIG. 5 is a graph showing the dependence of substrate warp on heating temperature.

FIG. 5 shows measured warps of the disk-shaped substrates. When the substrate is heated to a temperature not lower than 190° C. without using any mask, the warps of the substrates were 10 μm/3.5 inches or above. When the disk-shaped substrate has such a large warp, the disk-shaped substrate has poor film characteristics and the in-plane coercive force distribution is irregular, and it is undesirable to use such a disk-shaped substrate on a magnetic disk unit, and the disk-shaped substrate is unsuitable for high-density recording.

The warps of both the Ni—P/Al/Mg substrate and the glass substrate were 7 μm/3.5 inches or below when those substrates were heated through the masks 9. It is considered that the warps of the disk-shaped substrates could be reduced significantly because the disk-shaped substrates could be uniformly heated as shown in FIGS. 4(a) and 4(b).

EXAMPLE 3

Ni—P/Al/Mg substrates as disk-shaped substrates 10 were heated to temperatures in the range of 150 to 280° C. without using the masks by the same method as that used in Example 1, and then the warps of the substrates were measured.

Figure 6:
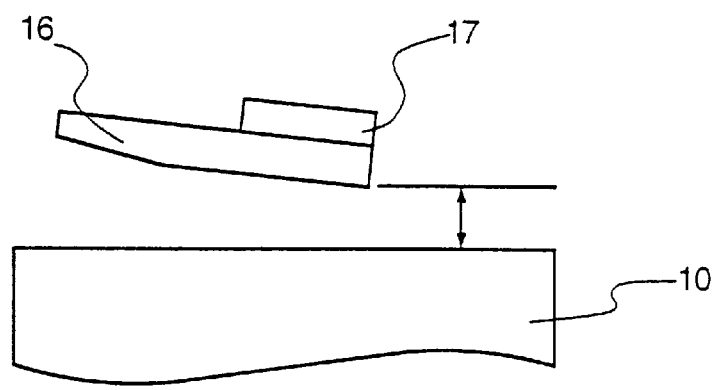
FIG. 6 schematically shows the position of a magnetic head with respect to a disk-shaped substrate.
Figure 7:
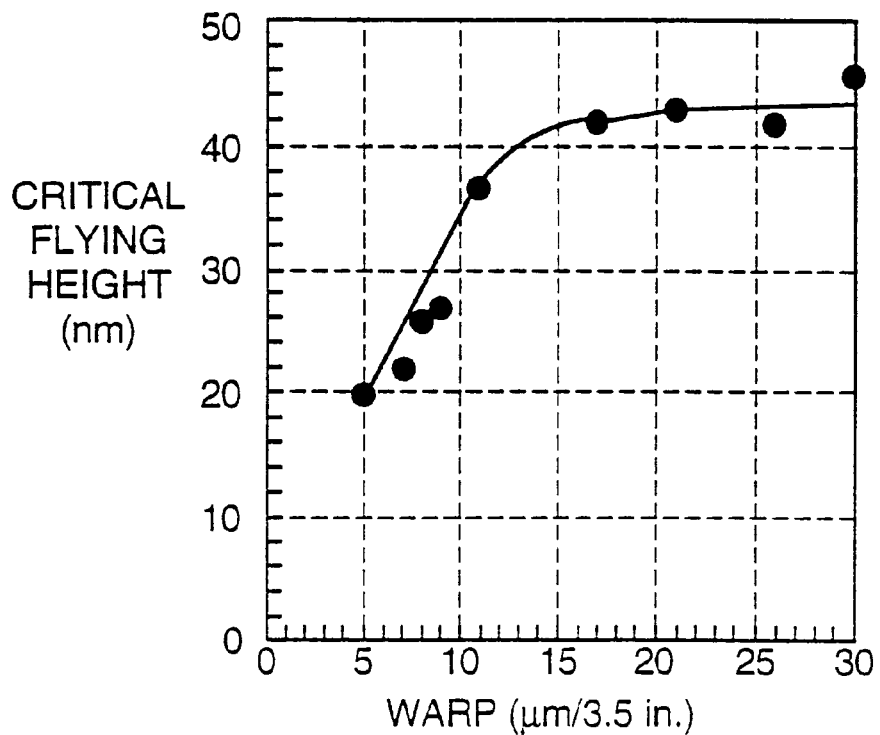
FIG. 7 is a graph showing the relation between a flying height of the magnetic head and the warp of the disk-shaped substrate.

As shown in FIG. 6, the flying height of a head 16 at which the disk-shaped substrate 10 starts coming into contact with the head 6 was measured at different spindle speeds by an acoustic emission sensor (AE sensor) 17. Measured results are shown in FIG. 7. As is evident from FIG. 7, the flying height of the head cannot be reduced below 40 nm unless the warp of the substrate, i.e., the warp of the peripheral part of the disk relative to the central part of the same, is 10 μm/3.5 inches or less. Measured results shown in FIG. 7 show that it is preferably for high-density recording that the warp of the peripheral part of a 3.5 inch magnetic disk having a coercive force of 2000 Oe relative to the central part of the same is 10 μm or below and the flying height of the magnetic head, i.e., the distance between the magnetic head and the magnetic disk, is 40 nm or below. The magnetic disk unit is constructed so as to meet those conditions.

EXAMPLE 4

Ni—P/Al/Mg substrates 10 were heated to temperatures between 150 and 280° C. by the method used in Example 2 using the type B masks shown in FIG. 2(b). Then, a 750 Å-thick base film 18, a 350 Å-thick magnetic film 19 (Co—Cr—Ta), a 200 Å-thick protective film 20, and a 50 Å-thick fluorolubricant film were formed on each substrate 10 to fabricate magnetic disks, as shown in FIG. 8. The base films, the magnetic films, and the protective films were formed at deposition rates of 200 Å/sec, 60 Å/sec and 40 Å/sec, respectively.

Figure 9:
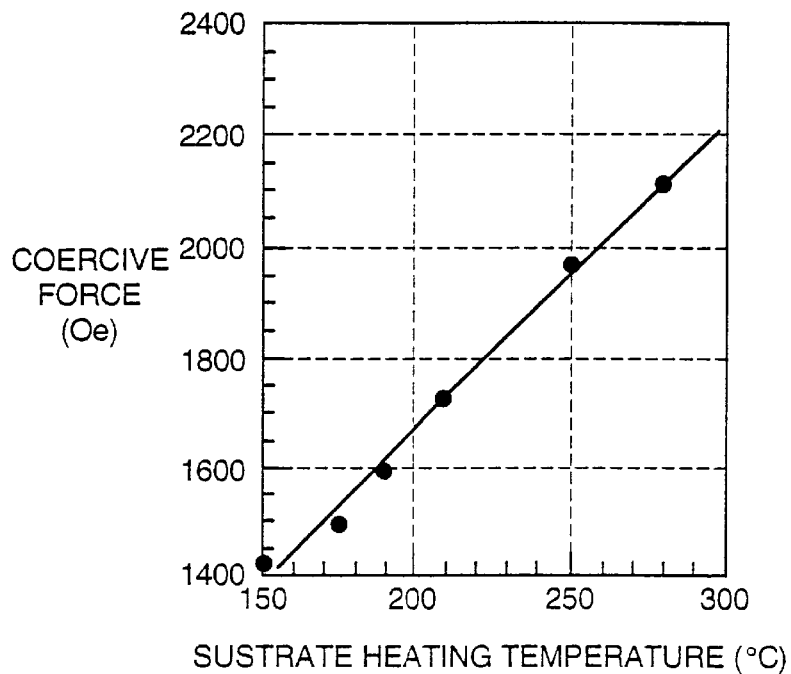
FIG. 9 is a graph showing the relationship between coercive force variation and substrate heating temperature.

Magnetic characteristics of the disks at a radius R=30 mm were measured at different temperatures by a vibrating sample magnetometer (BHV-50, Riken Denshi), in which a circumferential magnetic field of 5000 Oe was applied to the magnetic disks. FIG. 9 shows the dependence of the coercive force on the substrate heating temperature. Magnetic disks having substrates heated without using a mask had warp characteristics of 10 µm for a 3.5 inch disk, and a coercive force of 1600 Oe when the substrate heating temperature was 190° C. or above. These magnetic disks have poor film characteristics and are unsuitable for high-density recording.

Magnetic disks having substrates heated at 280° C. using the masks showed a warp characteristic of 6.2 µm/3.5 inches, and a circumferential coercive force of 2100 Oe. These magnetic disks have satisfactory film characteristics and are quite suitable for high-density recording.

A 3.5 inch glass substrate 10 (Corning) was heated at 250° C. using the type B mask, and a magnetic disk was fabricated by sequentially forming a 1000 Å-thick base film 18, a 300 Å-thick magnetic film 19 (Co-Cr-Pt), a 300 Å-thick protective film 20, and a 50 Å-thick fluorolubricant film, on the glass substrate 10.

The magnetic characteristics of portions of the magnetic disk on circles of radii R=15, 20, 25, 30, 35, 40 and 45 mm at angular intervals of 30° were measured in a circumferential magnetic field by an apparatus (RO-3000, Hitachi DECO) using the Kerr effect.

Figure 10:
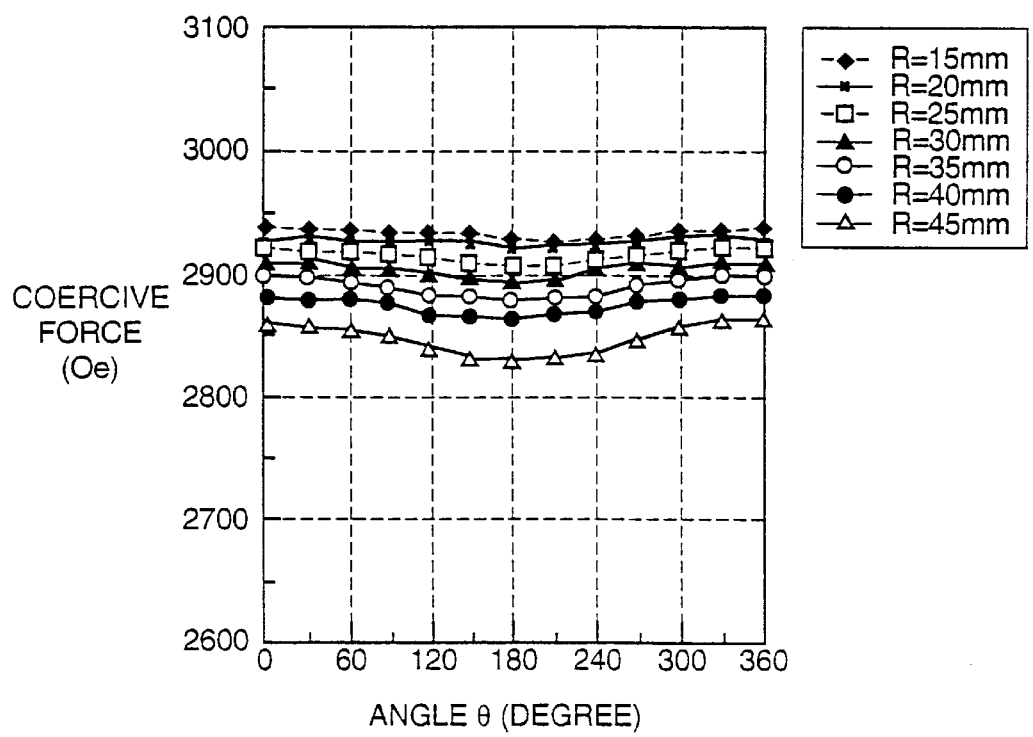
FIG. 10 is a graph of in-plane distribution of coercive force versus circumferential angle for a magnetic disk employing a glass substrate.

FIG. 10 shows the distribution of the in-plane coercive force of the magnetic disk. As shown, the range of radial distribution of the in-plane coercive force is 2830 to 2940 Oe, and the range of circumferential distribution of the in-plane coercive force on, for example, a track of radius R=45 mm is 2830 to 2870 Oe. Therefore, the range of distribution of the in-plane coercive force in an effective recording region (i.e., a data guarantee region) is ±5% or below. The warp of the substrate is 4.7 µm/3.5 inches. The magnetic disk has satisfactory film characteristics and is suitable for high-density recording.

EXAMPLE 5

Figure 11:
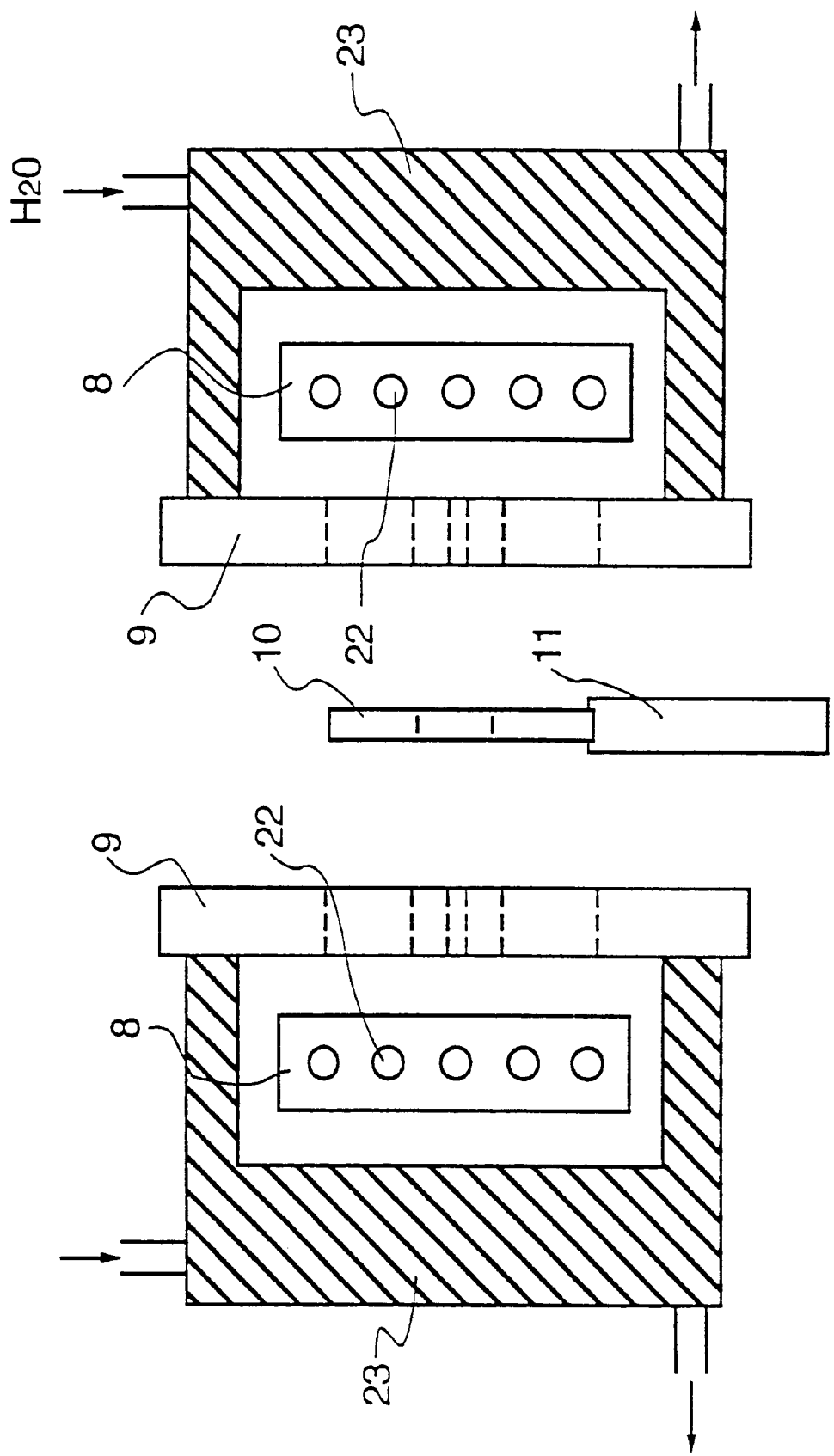
FIG. 11 is a schematic view of a heating device for heating a disk-shaped substrate.

As shown in FIG. 11, the type B masks 9 placed in the heating chamber 2 of the sputtering-type film-forming apparatus of FIG. 1 were cooled positively by cooling devices 23. Pure water as a cooling medium was circulated in the direction of the arrows. The heaters 8, having heating lamps 22, were used.

A Ni—P/Al/Mg substrate 10 was heated at 250° C. by the heaters 8 using the same method as in Example 1. The cooling devices 27 reduced the temperature of the masks from 430° C. to 280° C. Thus, problems attributable to high temperature, such as thermal deformation of the masks 9, can be prevented even when large heating power is necessary, by employing the cooling devices 17. Since the masks 9 can be disposed close to the heaters 8, the masks 9 can be used even if only a narrow space exists between each heater 8 and the substrate 10.

The present invention has been described with regard to preferred embodiments. However, upon reading the foregoing disclosure, the person of ordinary skill will readily recognize various modifications that may be made to the preferred embodiments.

For example, the surface of the heat radiation screening part 9a of the mask 9 on the heater side may be mirror-finished to reflect radiation from the heater. In a particular example, a Ni—P/Al/Mg substrate was heated at 250° C. using the masks 9 having the mirror-finished screening part 9a. The temperature of the masks 9 were reduced from 430° C. to 380° C. as a result of the mirror finish.

Moreover, heating efficiency can be improved by disposing reflectors or the like behind the heaters.

The masks 9 used in the foregoing embodiments are preferably formed of copper having excellent heat resistance. Since the heat conductivity of hot copper is as high as 395 J/m.s.K, the copper masks 9 can be efficiently cooled. Alternatively, the masks 9 may be formed of titanium, a ceramic, or the like.

Further, the same heating device can be used for uniformly heating disk-shaped substrates of different sizes, simply by using appropriate masks having sizes corresponding to those of the disk-shaped substrates, without requiring complex changes such as changing the distance between the disk-shaped substrates and the heaters, the division of the heaters, and the change of control balance. For example, in the embodiments shown in FIGS. 2(a) and 2(b), the central screening portion 9(a) preferably has a diameter of about 30 mm, while the spokes of FIG. 2(a) are each approximately 75 mm long for each of the four spokes. In FIG. 2(b), the diameter of the transmitting circle (i.e., the end point to end point dimension of two parallel spokes connecting at the center mask area 9a) is preferably about the diameter of the disk substrate being heated (roughly 100 mm for a 3.5 inch disk).

Additionally, the present invention is applicable to purposes other than heating substrates to be used for forming magnetic disks. For example, the present invention enables a vacuum evaporation system to form a uniform thin film on a substrate in a vacuum.

What is claimed is:

1. A magnetic recording disk, comprising:

a substrate;

a base layer on the substrate;

on the base layer, a magnetic layer having a coercive force of at least 2000 Oe;

a protective layer on the magnetic layer; and a lubricating layer on the protective layer;

wherein the substrate is warped radially from a center thereof by no more than 3 µm/inch.

2. A magnetic recording disk as claimed in claim 1, wherein the substrate has a diameter of 1.8 inches.

3. A magnetic recording disk as claimed in claim 1, wherein the substrate has a diameter of 2.5 inches.

4. A magnetic recording disk as claimed in claim 1, wherein the substrate has a diameter of 3.5 inches.

5. A magnetic recording disk as claimed in claim 1, wherein the substrate has a diameter of 5.25 inches.

6. A magnetic recording disk as claimed in claim 1, wherein the substrate is glass.

7. A magnetic recording disk as claimed in claim 1, wherein no part of the substrate periphery is warped relative to the substrate center by more than 10 µm.

8. A magnetic recording disk as claimed in claim 1, wherein the substrate is Ni—P/Al—Mg.

9. A magnetic recording disk as claimed in claim 1, wherein the substrate is at a temperature of at least 250° C., at a temperature distribution of ±3%, when the magnetic layer is formed thereon.

10. A magnetic recording disk as claimed in claim 9, wherein the substrate has a diameter of 1.8 inches.

11. A magnetic recording disk as claimed in claim 9, wherein the substrate has a diameter of 2.5 inches.

12. A magnetic recording disk as claimed in claim 9, wherein the substrate has a diameter of 3.5 inches.

13. A magnetic recording disk as claimed in claim 9, wherein the substrate has a diameter of 5.25 inches.

14. A magnetic recording disk as claimed in claim 9, wherein the substrate is glass.

15. A magnetic recording disk as claimed in claim 9, wherein no part of the substrate periphery is warped relative to the substrate center by more than 10 μm.

16. A magnetic recording disk as claimed in claim 9, wherein the substrate is Ni—P/Al—Mg.

17. A magnetic recording disk as claimed in claim 9, wherein the magnetic layer is CoCrTa.

18. A magnetic recording disk as claimed in claim 1, wherein the magnetic layer is CoCrTa.

19. A magnetic recording disk as claimed in claim 6, wherein the magnetic layer is CoCrTa.

20. A magnetic recording disk as claimed in claim 8, wherein the magnetic layer is CoCrTa.

21. A magnetic recording disk as claimed in claim 14, wherein the magnetic layer is CoCrTa.

22. A magnetic recording disk as claimed in claim 16, wherein the magnetic layer is CoCrTa.

23. A magnetic recording disk, comprising:

a substrate;

a base layer on the substrate;

on the base layer, a magnetic layer having a coercive force of at least 2000 Oe and a range of in-plane coercive force distribution of ±5% from innermost to outermost tracks of the magnetic layer;

a protective layer on the magnetic layer; and a lubricating layer on the protective layer.

24. A magnetic recording disk as claimed in claim 23, wherein the substrate has a diameter of 1.8 inches.

25. A magnetic recording disk as claimed in claim 23, wherein the substrate has a diameter of 2.5 inches.

26. A magnetic recording disk as claimed in claim 23, wherein the substrate has a diameter of 3.5 inches.

27. A magnetic recording disk as claimed in claim 23, wherein the substrate has a diameter of 5.25 inches.

28. A magnetic recording disk as claimed in claim 23, wherein the substrate is glass.

29. A magnetic recording disk as claimed in claim 23, wherein no part of the substrate periphery is warped relative to the substrate center by more than 10 μm.

30. A magnetic recording disk as claimed in claim 23, wherein the substrate is Ni—P/Al—Mg.

31. A magnetic recording disk as claimed in claim 23, wherein the substrate is at a temperature of at least 250° C., at a temperature distribution of ±3%, when the magnetic layer is formed thereon.

32. A magnetic recording disk as claimed in claim 31, wherein the substrate has a diameter of 1.8 inches.

33. A magnetic recording disk as claimed in claim 31, wherein the substrate has a diameter of 2.5 inches.

34. A magnetic recording disk as claimed in claim 31, wherein the substrate has a diameter of 3.5 inches.

35. A magnetic recording disk as claimed in claim 31, wherein the substrate has a diameter of 5.25 inches.

36. A magnetic recording disk as claimed in claim 31, wherein the substrate is glass.

37. A magnetic recording disk as claimed in claim 31, wherein no part of the substrate periphery is warped relative to the substrate center by more than 10 μm.

38. A magnetic recording disk as claimed in claim 31, wherein the substrate is Ni—P/Al—Mg.

39. A magnetic recording disk as claimed in claim 31, wherein the magnetic layer is CoCrTa.

40. A magnetic recording disk as claimed in claim 23, wherein the magnetic layer is CoCrTa.

41. A magnetic recording disk as claimed in claim 28, wherein the magnetic layer is CoCrTa.

42. A magnetic recording disk as claimed in claim 30, wherein the magnetic layer is CoCrTa.

43. A magnetic recording disk as claimed in claim 36, wherein the magnetic layer is CoCrTa.

44. A magnetic recording disk as claimed in claim 38, wherein the magnetic layer is CoCrTa.

* * * * *